(12) United States Patent
Ebner et al.

(10) Patent No.: US 7,542,164 B2
(45) Date of Patent: Jun. 2, 2009

(54) COMMON EXCHANGE FORMAT ARCHITECTURE FOR COLOR PRINTING IN A MULTI-FUNCTION SYSTEM

(75) Inventors: Fritz F. Ebner, Redwood City, CA (US); Donald J. Curry, Menlo Park, CA (US); Francis K. Tse, Rochester, NY (US); Peter A. Crean, Penfield, NY (US); David Birnbaum, Greensboro, NC (US); Doron Kletter, San Mateo, CA (US); Robert R. Buckley, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 939 days.

(21) Appl. No.: 10/890,125

(22) Filed: Jul. 14, 2004

(65) Prior Publication Data
US 2006/0012815 A1 Jan. 19, 2006

(51) Int. Cl.
*G06F 15/00* (2006.01)
*H04J 3/02* (2006.01)

(52) U.S. Cl. .................. 358/1.2; 370/462

(58) Field of Classification Search ............ 358/1.15, 358/1.2, 2.1, 406, 500, 1.16, 1.9, 1.14, 1.13, 358/1.6, 523; 370/389, 462; 382/162, 168, 382/274, 254; 715/209, 255, 234, 276; 400/61, 400/76; 709/203
See application file for complete search history.

(56) References Cited

U.S. PATENT DOCUMENTS

| | | | |
|---|---|---|---|
| 7,145,676 B2 * | 12/2006 | Fan | 358/1.15 |
| 2004/0001228 A1 * | 1/2004 | Goto et al. | 358/2.1 |
| 2004/0042687 A1 | 3/2004 | Curry et al. | |
| 2004/0051908 A1 | 3/2004 | Curry et al. | |
| 2004/0051909 A1 | 3/2004 | Curry et al. | |
| 2004/0052416 A1 | 3/2004 | Curry et al. | |
| 2004/0052419 A1 | 3/2004 | Curry et al. | |
| 2004/0052421 A1 | 3/2004 | Curry et al. | |
| 2004/0052427 A1 | 3/2004 | Curry et al. | |
| 2004/0052429 A1 | 3/2004 | Curry et al. | |
| 2004/0056835 A1 | 3/2004 | Curry et al. | |
| 2004/0096122 A1 | 5/2004 | Curry et al. | |
| 2008/0068630 A1 * | 3/2008 | Itagaki | 358/1.9 |

* cited by examiner

*Primary Examiner*—Saeid Ebrahimi Dehkordy
(74) *Attorney, Agent, or Firm*—Oliff & Berridge, PLC

(57) ABSTRACT

An image processing system as disclosed, including at least one input processing device functionally coupled to at least one output processing device, document information configured in a format such as scanning format or a document creating format converted to a common exchange format, and a common exchange format being converted to a format such as a document viewing format or document printing format. An image processing method also disclosed, including inputting document information, converting inputted document information configured in a document format such as a scanning format or a document creating format to a common exchange format, and converting the common exchange format to a document format such as a document viewing format or a document marking format.

40 Claims, 6 Drawing Sheets

COMMON EXCHANGE FORMAT ARCHITECTURE FOR COLOR PRINTING IN A MULTI-FUNCTION SYSTEM

BACKGROUND OF THE INVENTION

1. Field of Invention

The present invention relates generally to document image processing, and more particularly to systems and methods for processing image documents using a common exchange format.

2. Description of Related Art

Office multi-function devices have traditionally not shared a large proportion of image processing resources. This lack of resource sharing may lead to higher unit costs and significant visual differences between hard copy output that is printed and hard copy output that is copied. Additionally, devices have not had the ability to create local copies and remote copies with the same image quality and copy speed because the representations used to perform these functions are vastly different. Further, the same resources are not used to perform both the copy function and the scan function.

Printing color documents involves a series of data conversions. FIG. 1 is a schematic diagram illustrating a process 100 that includes, at a high level, various translations and conversions that are used to convert a document from, for example, a Windows™ application to, for instance, a hard copy. As shown in FIG. 1, the translation between an application and a hard copy involves, for example, converting the client document 110 from its internal structure or format to Graphic Device Interface (GDI) calls, then the GDI is translated to PostScript, PCL, or some other standard Page Description Language (PDL) in a conversion module 120. The PDL is next transmitted over a network, such as a local area network, to a printing device 130 which converts the vector representation of the document to a raster representation of the document.

Generally, for non-impact printers, the image to be printed is represented in a raster form (i.e. a rectangular array of "pixels") that represent image colors. For color printing, there are typically several of these raster images per page, each representing a "primary" separation of the image. Typical color separations for printing are cyan, magenta, yellow, and black. A raster image processor, or RIP, converts the page description language representation of the page into the raster image representation of the page. The raster image, once "RIP"ed, is stored in a frame buffer. When it is time to convert the image to hard copy output form, the image in the frame buffer is processed and converted to video signals to drive the image output terminal (IOT) at a speed that will keep up with the process speed of the output device. The conversion from frame buffer raster to the video signal may include filtering, scaling, halftoning, or other image processing functions. The important characteristic is that the frame buffer representation must be in a format that can be converted at engine speed to video signals that can drive a marking device (such as a laser or LED bar). Frame buffers contain raster images that are either binary, low bits per pixels (bpp) coded contone (halftoned), or full contone (at least about 8 bits per pixel, where the magnitude of the digital value represents the amount of colorant to put on the page). For binary or coded contone frame buffers, halftone quality is closely coupled to frame buffer raster resolution: The higher the resolution, in general, the higher the quality. In contrast, contone frame buffer resolution can be independent of raster resolution. There generally is a trade off between RIP speed and raster resolution. Color conversion is generally performed in the RIP software unless there is specialized acceleration hardware.

There are several drawbacks to the current approach for processing image documents. For instance, in the current approach, printing is a monolithic process. Thus, it is difficult to move parts of the processing to different points in the compute process chain. For instance, the existing approaches, including the model shown in FIG. 1, will not support conversion of the vector representation to a high level compact raster representation using a resource that existed on the Internet. Also, color correction is performed in the RIP, which takes considerable time and, accordingly, reduces productivity of the device. Moreover, for binary and low bpp contone, halftoning is performed in the RIP, which also takes time and reduces productivity. Performing halftoning in the RIP can incur significant performance penalty, especially if the halftones are large such as in typical color devices. Additionally, some compression algorithms are tuned to halftone details, which translate into an additional time penalty to optimize the compression when the halftone changes. Furthermore, document images that are halftoned during the RIP process are not very compressible because they must use lossless image compression algorithms. This problem is made significantly worse when the halftoning method is 'noisy' (e.g. using stochastic screens or error diffusion).

SUMMARY OF THE INVENTION

In light of the above described problems and shortcomings, various exemplary embodiments of the systems and methods according to this invention provide for an image processing system that prepares an input document image inputted by an input device and formatted in a first document format, for output in a second document format in an output device. The document image is described by image signals, the system including at least a controller that transforms the image signals inputted by at least one input device and formatted in the first document format to a common exchange format, the first document format including one of a document scanning format and a document creating format (or page description language). The controller also transforms the image signals formatted in the common exchange format to the second document format, the second document format including one of a document viewing format and a document marking format. Additionally, the Common Exchange Format can be archived in a storage medium for later use. The Common Exchange Format image is represented in a mixed raster content form, meaning the image is composed of one or more image layers, where the image layers may have different resolutions and bits per pixel. Each image layer is compressed using a standard compression algorithm that is appropriate for the image content and bits per pixel, as is described in "Mixed Raster Content (MRC) Model for Compound Image Compression" (Corporate Research & Technology, Xerox Corp.), which is incorporated herein by reference in its entirety. For example, images of 8 bits per pixel can be compressed using JPEG compression, whereas images of 1 bit per pixel can be compressed using CCITT G4 compression. A mixed raster content form also specifies how the image layers are to be combined to recreate a single image that can be viewed or printed.

Further, various exemplary embodiments of the systems and methods according to this invention provide for an image processing method that includes inputting document information, transforming inputted document information formatted in a first document format to a document formatted in a common exchange format, the first document format including a document scanning format, as described in U.S. patent application Ser. No. 10/612,250, "Weak Edge Repositioning in a MRC Segmentor"; U.S. patent application Ser. No. 10/612,264, "Page Background Detection and Neutrality on Scanned Document"; U.S. patent application Ser. No. 10/612,461, "Background Suppression and Color Adjustment Method"; U.S. patent application Ser. No. 10/612,062, "Efficient Interpolation Technique Using Programmable Node Spacing"; U.S. patent application Ser. No. 10/612,261, "Scan Color Conversion Method"; U.S. patent application Ser. No. 10/612,246, "Segmentation Method and System for Multiple Raster Content (MRC) Representation of Documents"; U.S. patent application Ser. No. 10/612,368, "Segmentation Method and System for Multiple Raster Content (MRC) Representation of Documents"; U.S. patent application Ser. No. 10/612,248, "Segmentation Method and System for Multiple Raster Content (MRC) Representation of Documents"; U.S. patent application Ser. No. 10/612,063, "Foreground Erosion Method and System for Multiple Raster Content (MRC) Representation of Documents"; U.S. patent application Ser. No. 10/612,064, "Digital De-Screening Technique for Scanned Documents"; and U.S. patent application Ser. No. 10/612,084, "Halftone Screen Frequency and Magnitude Estimation for Digital De-screening of Documents", each of which is incorporated herein by reference in its entirety, or a document creating format, as described in U.S. patent application Ser. No. 10/612,057, "Prioritized PDL Segmentation Producing Two Bit Selector", that is also incorporated herein by reference in its entirety, and transforming the document information formatted in the common exchange format to a document formatted in a second document format, the second document format including a document viewing format (e.g. rendered on a computer monitor by, for example, Adobe Reader) or a document marking format (e.g. video signals used to drive a marking engine).

Moreover, various exemplary embodiments of the systems and methods according to this invention provide for a non-impact (xerographic or ink jet) marking device that includes an input processing device and an output processing device functionally coupled to the input processing device wherein a first document inputted from at least one input device in a first document format is transformed to a common exchange format, the first document format being a document scanning format or a document creating format. Also, the common exchange format is transformed to a second document format compatible with the at least one output processing device, the second document format being a document viewing format or a document marking format.

One of the advantages of the CEF format is that it uses mixed raster content notions to obtain high edge precision, high gray value depth, high compression and high image quality with the same representation.

Furthermore, various exemplary embodiments of the systems and methods according to this invention provide for a machine-readable medium that provides instructions for transforming data to and from a common exchange format, the instructions, when executed by a processor, cause the processor to perform several operations. These operations include inputting document information, transforming inputted document information formatted in a first document format to a document formatted in a common exchange format, the first document format comprising a document scanning format or a document creating format, and transforming the document information formatted in the common exchange format to a document formatted in a second document format, the second document format comprising a document viewing format or a document marking format.

BRIEF DESCRIPTION OF THE DRAWINGS

Various exemplary embodiments of the systems and methods of this invention will be described in detail, with references to the following figures, wherein.

DETAILED DESCRIPTION OF PREFERRED EMBODIMENTS

These and other features and advantages of this invention are described in, or are apparent from, the following detailed description of various exemplary embodiments of the systems and methods according to this invention.

Figure 1:
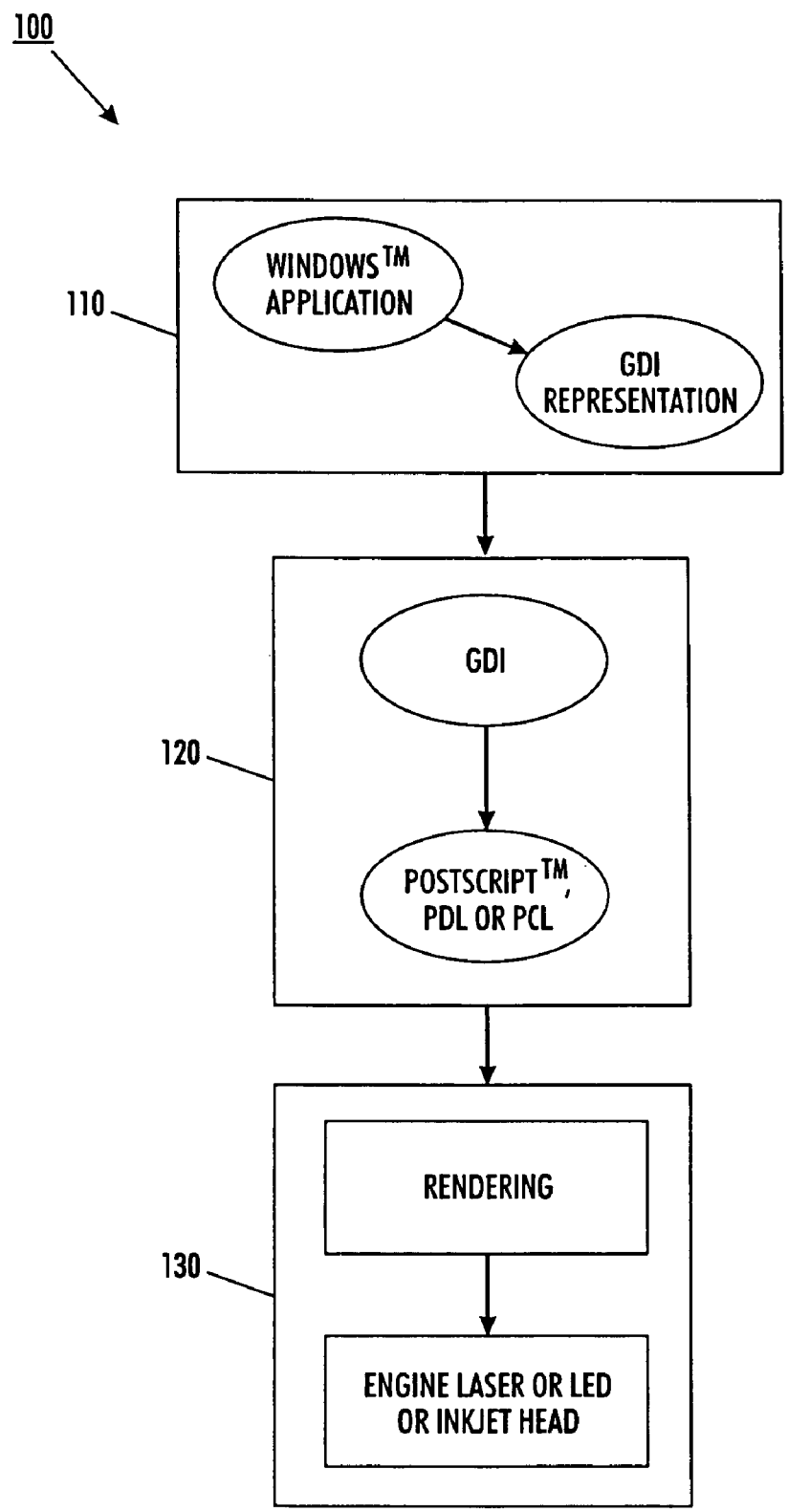
FIG. 1 is a schematic illustration of an image processing approach according to conventional systems and methods.
Figure 2:
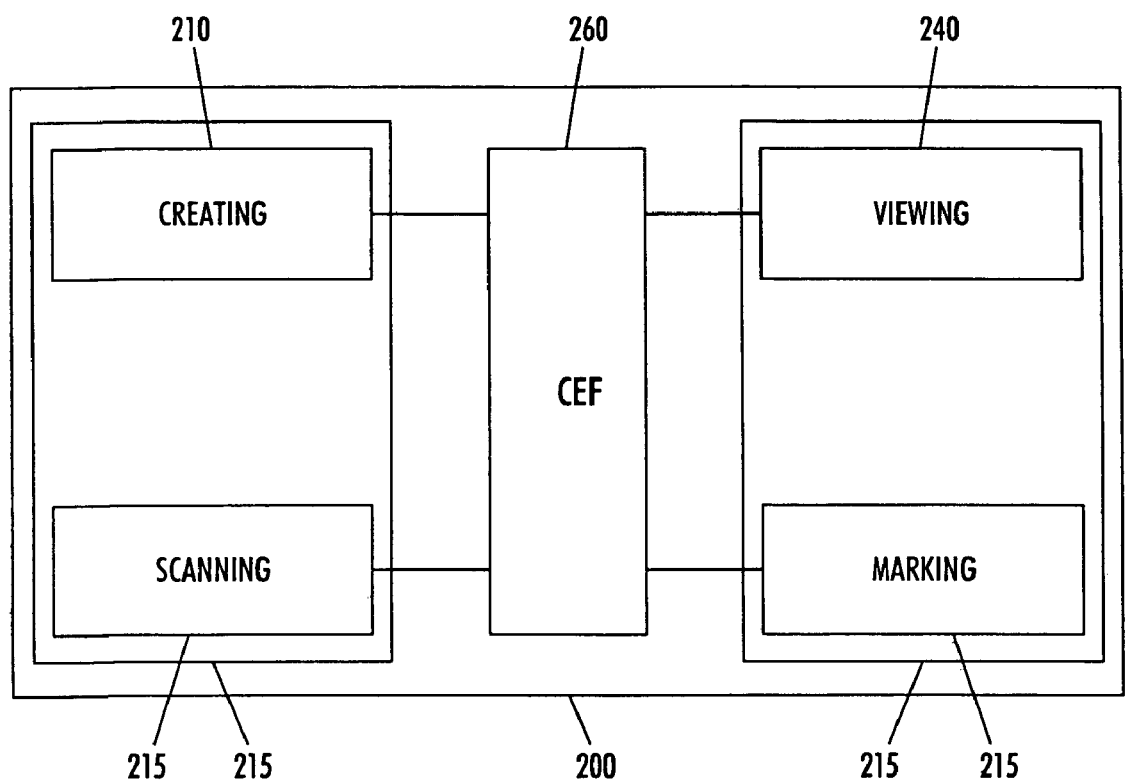
FIG. 2 is a schematic illustration of image processing according to various exemplary embodiments of this invention.

FIG. 2 is a schematic illustration of the different components of a Common Exchange Format system 200 according to various exemplary embodiments of the methods and systems of this invention. In FIG. 2, both the creating section 210 and the scanning section 220 illustrate an input section 215 where data is created from a document processing software in the creating section 210 or scanned from a scanner in the scanning section 220 and then converted to the Common Exchange Format 260. According to various exemplary embodiments, the viewing section 240 and the marking section 230 illustrate an output section 235 where the documents converted to the Common Exchange Format 260 from the input section 215, i.e., creating section 210 and the scanning section 220, are converted to a format that is viewable in the viewing section 240 or that can be marked in the marking section 230.

According to various exemplary embodiments, both the creating section 210 and the scanning section 220 convert document data to the Common Exchange Format 260, wherein the Common Exchange Format is a mixed raster content representation. The creating section 210 uses an RGB color space of the color in creating the Common Exchange Format. The RGB color space allows, for instance, the color correction to be deferred to marking section 230, which decreases the computational load during the conversion to the Common Exchange Format 260. The contone RGB color space, according to various exemplary embodiments of this invention, also allows for the halftoning to be deferred to the marking section 230, and allows identical halftoning to be applied to both copied and printed output from the multifunction device.

Figure 3:
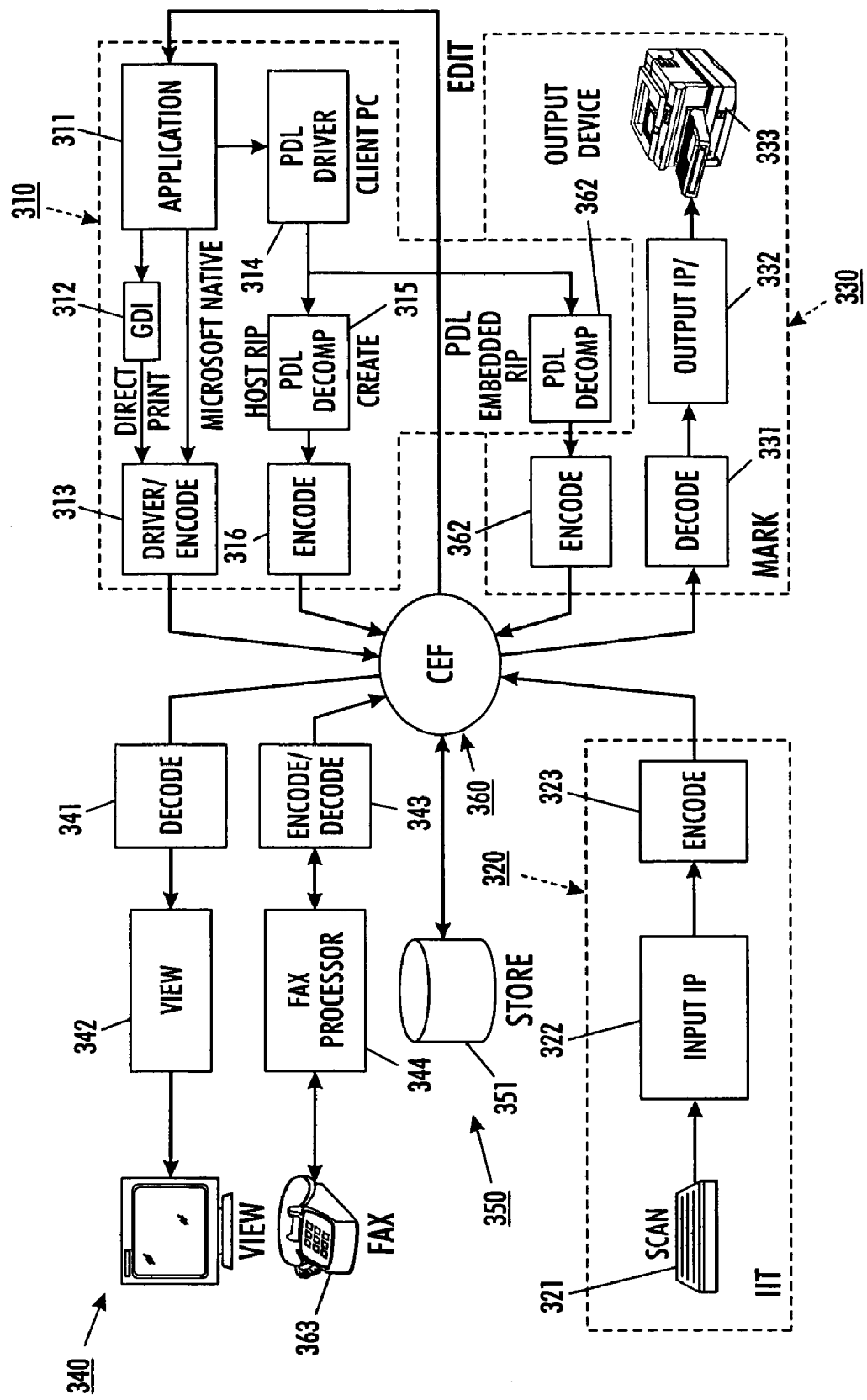
FIG. 3 is a schematic representation of the different components of the Common Exchange Format, according to various exemplary embodiments of this invention.

FIG. 3 is a schematic illustration of an image data processing system 300 according to various exemplary embodiments of this invention. In FIG. 3, the Common Exchange Format (CEF) 360 is a format which enables the different modules of the system, i.e., the create module 310, the scan module 320, the mark module 330, and the view module 340, to communicate with each other. This communication can be local (within a device), or remote (between device). According to various exemplary embodiments, the create module 310 converts page description language (PDL), including GDI, to a document formatted in the CEF 360, or alternatively to some mixed raster representation that is quickly convertible to the CEF 360. Also according to various exemplary embodiments, the scan module 320 converts scanned input to a document formatted in the CEF 360. According to various exemplary embodiments, the view module 340 converts the document formatted in the CEF 360 to a display medium, and the mark module 330 converts the document formatted in the CEF 360 to video signals that feed an image output terminal. Also, according to various exemplary embodiments, a store module 350 may be added to allow archiving of all the files. A preferred embodiment of the CEF is described using the Adobe PDF™ format, so it can be retrieved from the store module 350 at a later time, and viewed or printed easily.

According to various exemplary embodiments, the create module 310 includes an application software 311 that allows the creation of a document with a GDI driver 312. Subsequently, the GDI format 312 is converted to the CEF 360 using the driver/encoder 313. Alternatively, according to various exemplary embodiments, the application software 311 drives a PDL driver 314 which is coupled to a PDL decoder in the host RIP 315 before being encoded in the encoder 316 into a document formatted in the CEF 360. Additionally, according to various exemplary embodiments, the application software 311 drives a PDL driver 314 which is coupled to a PDL decoder in the embedded (in the multifunction device) RIP 361 before being encoded in the encoder 362 into a document formatted in the CEF 360.

According to various exemplary embodiments, the scan module 320 includes a scanner 321 that transmits data to an input image processing module (IP) 322 The input IP 322 performs various image processing tasks, and then is functionally coupled to an encoder 323 which encodes the data into a document formatted in the CEF 360.

According to various exemplary embodiments, the mark leg 330 receives a document configured in a document formatted in the CEF 360 and decodes the document through the decoder 331. The document is then transmitted to an output image processing module (IP) 332 which drives an output device 333 such as, for example, a printer. Alternatively, according to various exemplary embodiments, the document formatted in the CEF 360 that has been stored in the storage module 350 can be retrieved from the storage module 350 and either viewed through the mark module 340 or outputted to hard copy on the through the mark module 330.

According to various exemplary embodiments, the view module 340 includes a decoder 341 that decodes the document format configured in the CEF 360 and displays the document on a displaying\viewing device 342 such as, for instance, a computer monitor. Alternatively, the document configured in the CEF 360 is decoded by an decoder 343 that is functionally coupled to a fax system 344 which encodes the document into fax format and which can transmit information to the facsimile system 363.

According to various exemplary embodiments, a store module 350 receives document data formatted in the CEF 360 and stores it in a storage device 351.

Accordingly, the use of a mixed raster representation as a Common Exchange Format allows smaller file size without sacrificing quality, for instance, by being able to store contone image information at a low resolution, while maintaining edge acuity by storing binary edge information at high resolution. For instance, a 600 dot per inches (dpi) image can store contone data at 150 dpi, and binary data at 600 or 1200 dpi, which is then compressed using standard compression techniques to further reduce file size. Moreover, according to various exemplary embodiments of the methods and systems of this invention, the CEF allows the user to directly create a CEF file from a GDI input using a Windows™ print driver. Accordingly, creating a CEF and CEF like formats on a client PC is an effective way to design lower cost systems since much of the computation burden is carried by the client PC, according to various exemplary embodiments of this invention.

According to various exemplary embodiments, this new architecture, which includes the CEF, enables many new features, such as "RIPing" a document to 150 dpi contone RGB (fast foto mode). This approach will produce good quality images of natural scenes and is faster than RIPing at standard resolutions (600 dpi or higher). This new architecture also enables to RIPing to 300 dpi and sub-sample the foreground and background planes to 75 dpi (draft mode). This approach is a fast mode with scalable image quality, and the resulting file sizes are small. This new architecture, according to various exemplary embodiments, also allows RIPing to 300 dpi contone RGB (fast normal mode), sub-sample the foreground and background planes to 150 dpi and up sample the selector plane to 600 dpi using a resolution enhancement technology. Accordingly, fast normal mode allows for very high quality photos, sweeps, colors and good text and lines, and is faster than conventional 600×600×1 CYMK rendering.

According to various exemplary embodiments, this new architecture also enables RIPing to 600 dpi contone (normal mode), sub-sample foreground and background by 4× in each dimension. This creates files that have a compression ratio of approximately 200/1 on average, with very good image quality.

According to various exemplary embodiments, this new architecture further allows RIPing to 600 dpi contone RGB (high quality mode) and to use a resolution enhancement technology to up sample the selector plane to a higher resolution. This makes for very high quality documents and allows this high quality for the computation cost similar to a 1200×600 binary CMYK, but with higher quality halftones and much smaller compressed files.

Figure 4:
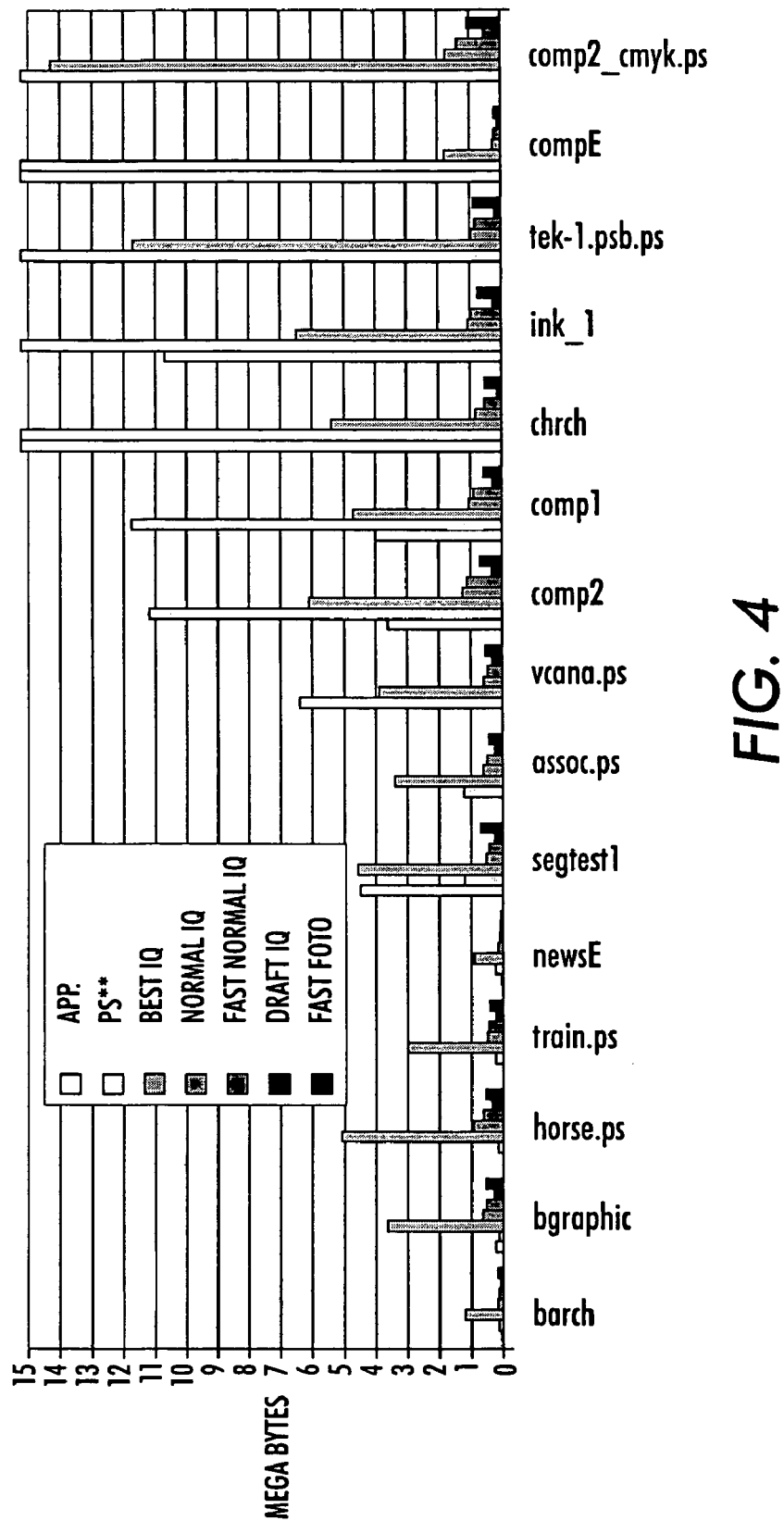
FIGS. 4-5 are charts illustrating file size comparisons between Common Exchange Format files and other types of document files.
Figure 5:
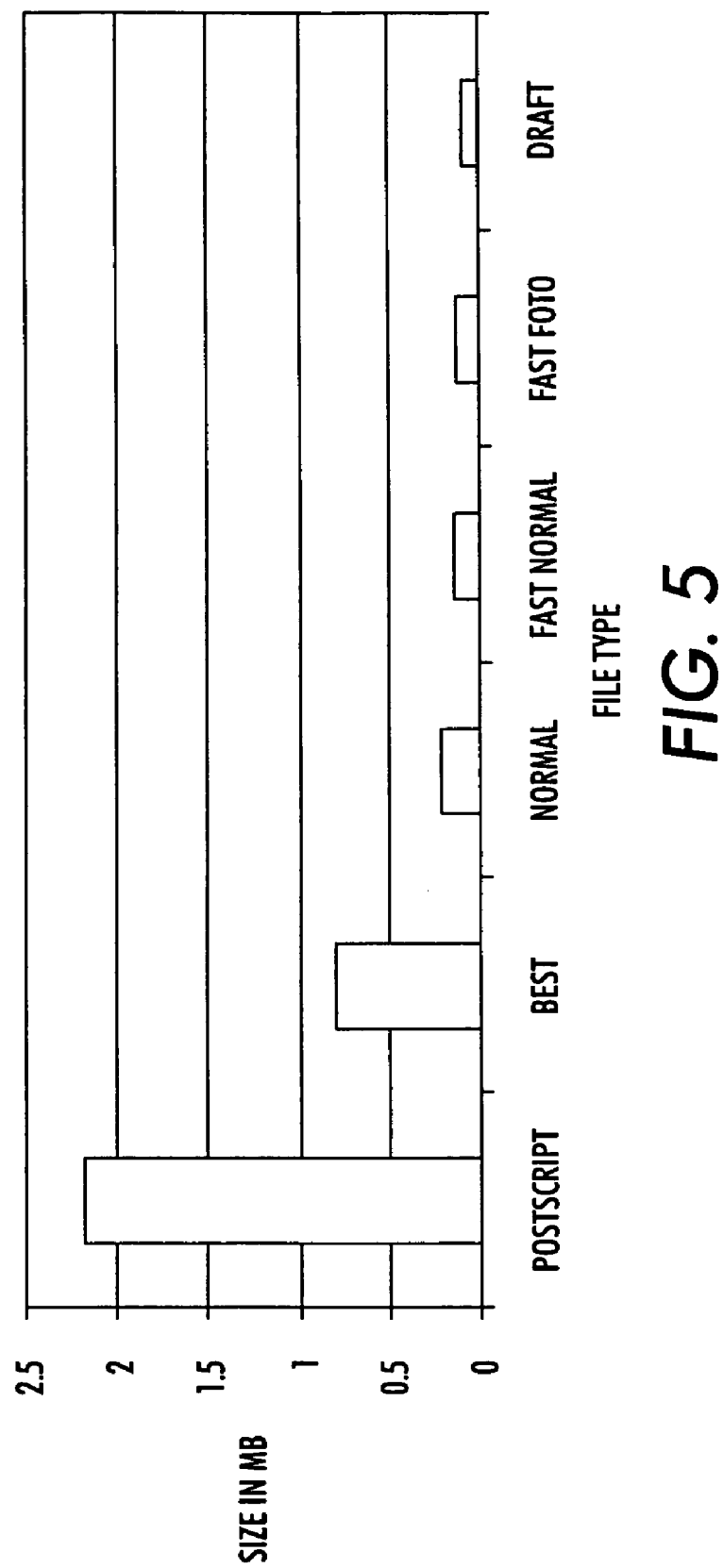

FIGS. 4 and 5 are charts illustrating file size comparisons between CEF files and other types of document files. The review of FIG. 4 indicates that, according to various exemplary embodiments, for very simple text documents and simple business graphics, normal mode and PostScript file sizes are about the same order of magnitude in size and both file sizes are very small.

Moreover, FIG. 4 indicates that, for complex graphics with no sampled image content, CEF files, such as, for example, Best, Normal, Fast Foto and Draft, are generally larger than post script files. Also, for composite documents with sampled image content, CEF files are generally smaller in size than PostScript files.

Specifically, FIG. 5 is a chart illustrating a file size comparison in a typical compound business document. According to various exemplary embodiments, the typical compound business document includes text, bar charts and a small sampled image. Clearly, the PostScript file size is much larger than any of the CEF files (Best, Normal, Fast Foto and Draft), including the largest CEF file, which is the Best Mode file.

Figure 6:
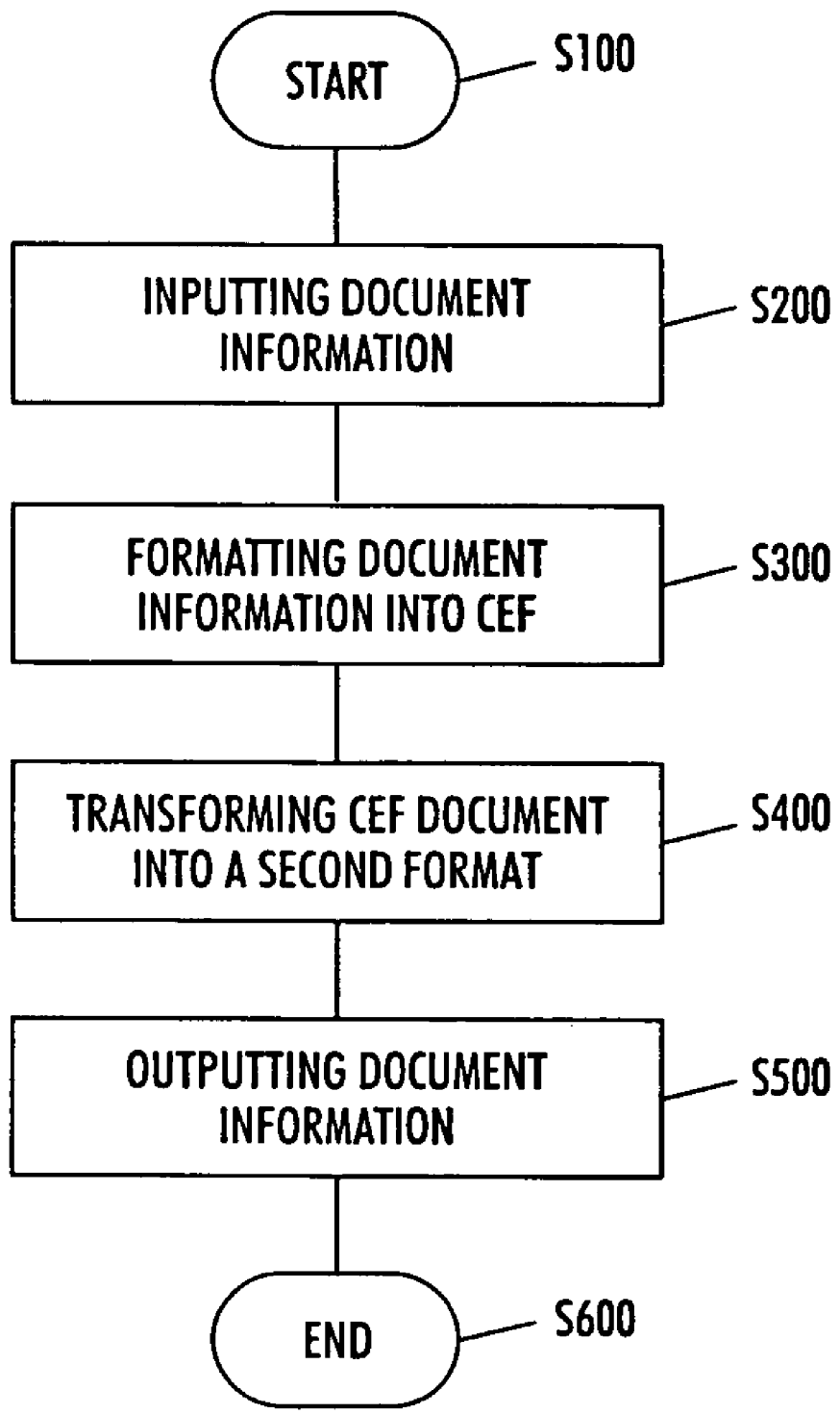
FIG. 6 is flowchart illustrating a method of image data processing according to various exemplary embodiments of this invention.

FIG. 6 is a flow chart illustrating the image processing method according to various exemplary embodiments of this invention. The method starts in step S100. Next, during step S200, document information is inputted into the CEF system. Inputting to the CEF system comprises converting the application software to a page description language through a print driver, converting the page description language to a contone raster image using a RIP process. Once the document information, configured in a first document format, is inputted during step S200, then the document information is converted to a Common Exchange Format during step S300.

Converting the contone raster image to the Common Exchange Format during step S300 comprises segmenting the image to differentiate between edge and non-edge regions, separating the image to into a plurality of image separations, including at least one contone image and one binary selector image. Once the images have been separated, the contone images are filled where the selector plane determines they have non-valid pixels, and the contone image is downsampled. Following downsampling of the contone image, all the image separations are compressed using standard compression algorithms. Next, control goes to step S400.

During step S400, the document information converted to a Common Exchange Format, is further converted to a second document format that is either a document viewing format or a document marking format. Conversion to a document marking format, for example, comprises decompressing the separated images in the CEF format, and recombining them to create a single high resolution contone image, then performing color correction, edge enhancement, and halftoning. Finally, control continues to step S500, where the, for example, the document marking format is sent, as video signals, to the document marking device to create hard copy output. Control then continues to step S600, where the method ends.

While the invention has been described in conjunction with the exemplary embodiments, these embodiments should be viewed as illustrative, not limiting. Various modifications, substitutes, or the like are possible within the spirit and scope of the invention.

What is claimed is:

1. An image processing system for preparing a document image from at least one input device, the document image being formatted in a first document format, for output in at least one output device, the output document image being formatted in a second document format, the document image being described by image signals, the system comprising a controller that:
    transforms the image signals input by the at least one input device and formatted in the first document format to a common exchange format, the first document format comprising a document creating format; and
    transforms the image signals formatted in the common exchange format to the second document format, the second document format comprising one of a document viewing format and a document marking format; wherein
    the common exchange format is a mixed raster content image,
    the image signals formatted in the document creating format comprise synthetic document information, and
    transforming the synthetic document information from the at least one input device to the common exchange format comprises:
        transforming the synthetic document information to a raster image; and
        transforming the raster image into the common exchange format.

2. The image processing system of claim 1, wherein transforming the image signals formatted in the common exchange format to a document viewing format comprises:
    transforming the common exchange format to a document format viewable by a display device.

3. The image processing of claim 1, wherein transforming the image signals formatted in the common exchange format to a document marking format comprises:
    transforming the common exchange format to a document format capable of being imaged by an imaging device.

4. The image processing system of claim 3, wherein transforming the image signals formatted in the common exchange format to a document marking format comprises:
    transforming document information from the common exchange format to video signals.

5. The image processing system of claim 3, wherein the imaging device includes a hardcopy imaging device.

6. The image processing system of claim 3, wherein the format capable to be imaged by an imaging device is a video signal capable of driving a hardcopy imaging device at the rated speed of said hardcopy imaging device.

7. The image processing system of claim 1, wherein the common exchange format is a common exchange format image representation.

8. The image processing system of claim 7, wherein the common exchange format image representation contains non-binary data.

9. The image processing system of claim 7, wherein the common exchange format image representation contains colors in a device-independent color space.

10. The image processing system of claim 7, wherein the common exchange format image representation contains multiple image layers.

11. The image processing system of claim 7, wherein the common exchange format image representation includes a document format.

12. The image processing system of claim 11, wherein the document format includes PDF.

13. The image processing system of claim 1, wherein the synthetic document information is PostScript data.

14. The image processing system of claim 1, wherein transforming the image signals formatted in the common exchange format to a document viewing format is performed via a document viewing software.

15. The image processing system of claim 14, wherein the document format viewing software includes Adobe Reader.

16. The image processing system of claim 1, wherein transforming the raster image into the common exchange format is performed at the rated speed of an imaging device.

17. The image processing system of claim 1, wherein the raster image color space is an RGB color space.

18. The image processing system of claim 1, wherein the raster image color space is a CMYK color space.

19. The image processing system of claim 1, wherein the raster image color space is a UCR color space.

20. An image processing method comprising:
    inputting document information;
    transforming inputted document information formatted in a first document format to a document formatted in a common exchange format, the first document format comprising a document creating format; and
    transforming the document information formatted in the common exchange format to a document formatted in a second document format, the second document format comprising a document viewing format or a document marking format, wherein
    the common exchange format is a mixed raster content image,
    the input document information is synthetic document information, and transforming the synthetic document information in a document formatted in the common exchange format comprises:
  converting the synthetic document information to a raster image; and
  converting the raster image into a document formatted in the common exchange format, wherein the above steps are implemented by a processor.

21. The image processing method of claim 20, wherein transforming inputted document information formatted in the common exchange format to a document formatted in a document viewing format comprises:
  transforming the document formatted in the common exchange format to a document format viewable by a display device.

22. The image processing method of claim 21, wherein transforming the document formatted in the common exchange format to a document format viewable by a display device uses a document format viewing software.

23. The image processing method of claim 22, wherein the document format viewing software includes Adobe Reader.

24. The image processing method of claim 20, wherein transforming inputted document information formatted in the common exchange format to a document formatted in a document marking format comprises:
  transforming the document formatted in the common exchange format to a document format capable of being imaged by an imaging device.

25. The image processing method of claim 24, wherein the imaging device includes a hardcopy imaging device.

26. The image processing method of claim 20, wherein transforming inputted document information formatted in the common exchange format to a document formatted in a document marking format comprises:
  transforming the document formatted in the common exchange format to video signals.

27. The image processing method of claim 26, wherein transforming the document formatted in the common exchange format to video signals is performed at the rated speed of the hardcopy imaging device.

28. The image processing method of claim 20, wherein the common exchange format is a common exchange format image representation.

29. The image processing method of claim 28, wherein the common exchange format image representation contains non-binary data.

30. The image processing method of claim 28, wherein the common exchange format image representation contains colors in a device-independent color space.

31. The image processing method of claim 28, wherein the common exchange format image representation contains multiple image layers.

32. The image processing method of claim 28, wherein the common exchange format image representation includes a document format.

33. The image processing method of claim 32, wherein the document format includes PDF.

34. The image processing method of claim 20, wherein the synthetic document information is PostScript data.

35. The image processing method of claim 20, wherein converting the raster image into a document formatted in the common exchange format is performed at the rated speed of an imaging device.

36. The image processing method of claim 20, wherein the raster image color space is an RGB color space.

37. The image processing method of claim 20, wherein a raster image color space is a CMYK color space.

38. The image processing method of claim 20, wherein a raster image color space is a UCR color space.

39. A xerographic marking device comprising:
  at least one input processing device;
  at least one output processing device functionally coupled to the at least one input processing device, and a controller that:
  transforms a first document information inputted from the at least one input device and formatted in a first document format to a common exchange format, the first document format comprising a document creating format; and
  transforms the document information formatted in the common exchange format to a second document format compatible with the at least one output processing device, the second document format comprising one of a document viewing format and a document marking format, wherein
  the common exchange format is a mixed raster content image,
  the first document information is synthetic document information, and
  transforming the synthetic document information from the at least one input device to the common exchange format comprises:
    transforming the synthetic document information to a raster image; and
    transforming the raster image into the common exchange format.

40. A machine-readable medium that provides instructions for transforming data to and from a common exchange format, the instructions, when executed by a processor, cause the processor to perform operations comprising:
  inputting document information;
  transforming inputted document information formatted in a first document format to a document formatted in a common exchange format, the first document format comprising a document creating format; and
  transforming the document information formatted in the common exchange format to a document formatted in a second document format, the second document format comprising a document viewing format or a document marking format; wherein
  the common exchange format is a mixed raster content image,
  the input document information is synthetic document information, and
  transforming synthetic document information to the common exchange format comprises:
    transforming the synthetic document information to a raster image; and
    transforming the raster image into the common exchange format.

* * * * *